May 20, 1958 J. F. CHAMBERLIN ET AL 2,835,501
MAIL BAG CART
Filed Jan. 24, 1955 2 Sheets-Sheet 2
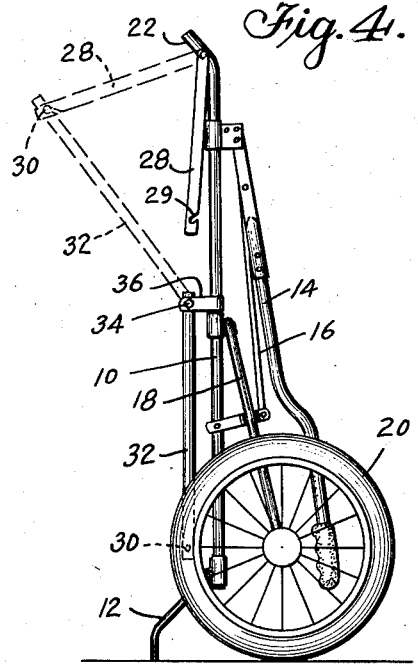
Fig. 4.
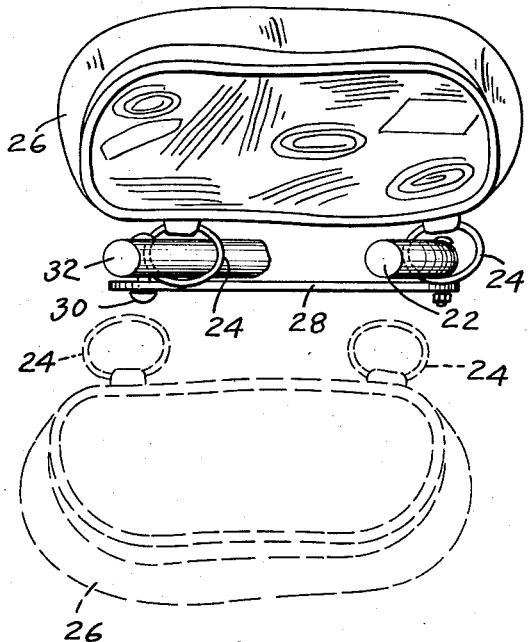
Fig. 5.
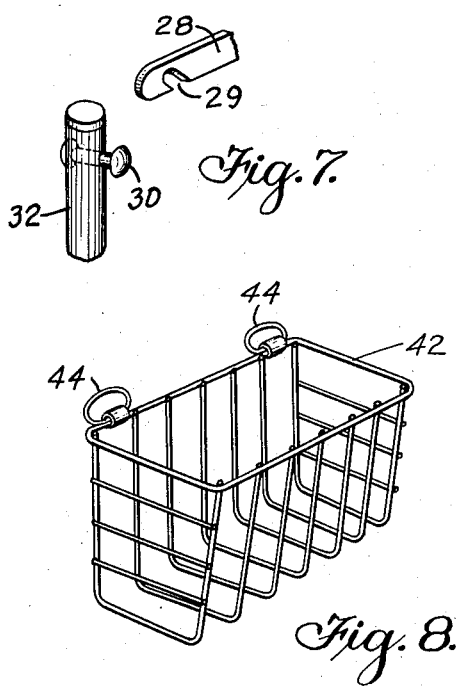
Fig. 7.
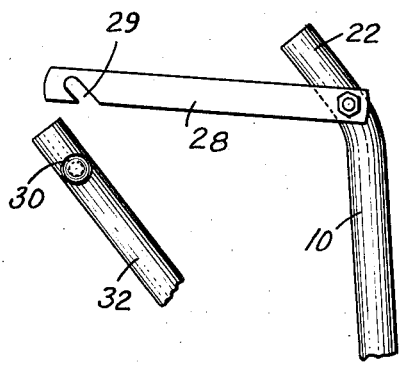
Fig. 6.
Fig. 8.
INVENTORS
JOSEPH F. CHAMBERLIN
BY ROBERT A. WESTPHAL
ATTORNEY

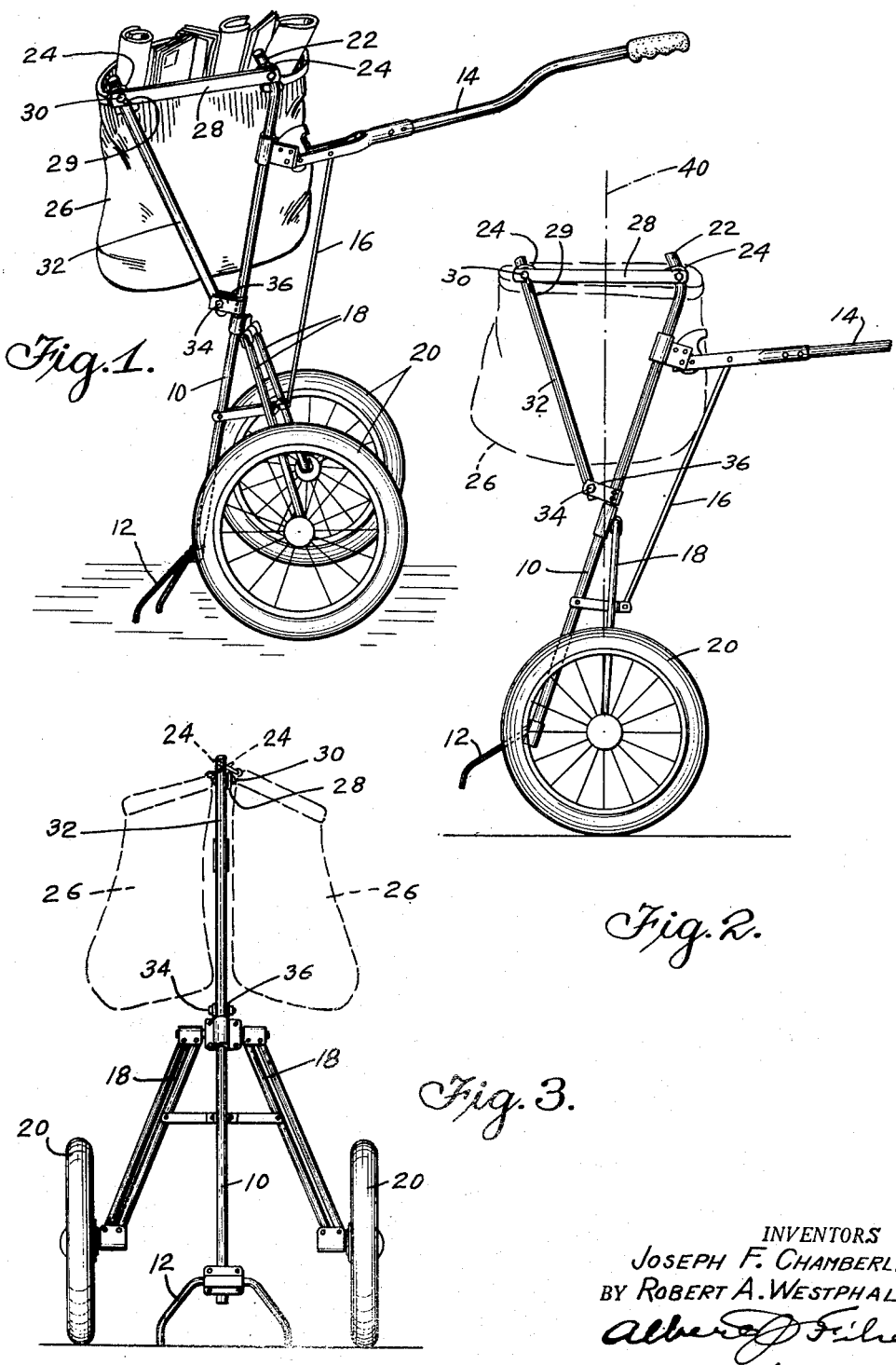

United States Patent Office 2,835,501
Patented May 20, 1958

2,835,501

MAIL BAG CART

Joseph F. Chamberlin and Robert A. Westphal, Chicago, Ill., said Westphal assignor to said Chamberlin Application January 24, 1955, Serial No. 483,691

1 Claim. (Cl. 280—41)

This invention relates to an improved mail bag cart and the present invention comprises a continuation in part of and further improvements in our earlier invention entitled "Postman's Cart" which was filed on September 13, 1954, Serial No. 455,589, now abandoned.

One of the important objects of this invention is to provide a collapsible cart for carrying mail bags or the like which includes a pivoted yard arm so positioned that when the cart is in a mobile position, the center of weight of the supported bag or bags is practically always directly over the axle upon which the cart wheels are mounted.

Another object of the invention is to provide a cart for mail bags or the like which is automatically balanced under practically all conditions and regardless of the load in the bags.

A further object is to provide a collapsible cart of the class described which, when not in use, can be stored in a relatively small space and which, with little or no change, will allow of the carrying of objects other than mail bags, such as boxes, baskets, golf bags and the like.

Yet another object of the invention is the provision in a carrying vehicle for mail bags of means for supporting the bags in a very easily accessible position and from whence it can be quickly installed and also practically immediately removed with a minimum expenditure of time and trouble.

Another and still further important object of the invention is the construction of a cart for carrying mail bags or the like wherein any weight placed thereon in almost any manner will be practically automatically balanced so far as the ground contacting elements of the cart are concerned.

Other and further important objects of the invention will be apparent from the disclosures in the accompanying drawing and following specification.

The invention, in a preferred form, is illustrated in the drawings and hereinafter more fully described.

In the drawings:

Figure 1 is a side perspective of the improved mail bag cart of this invention showing the same in static position.

Figure 2 is a similar view illustrating the cart in mobile position.

Figure 3 is a front elevation of the cart of Figure 1, showing the same supporting two bags.

Figure 4 is a side elevation of the cart illustrating the same in collapsed position for storage or transportation when not in use.

Figure 5 is a somewhat schematic view of the mail bag supporting elements of the cart, showing one bag in actual position and the other about to be applied or otherwise just removed.

Figure 6 is an enlarged detail view of the structure of the pivoted yard arm.

Figure 7 is a further enlarged view of certain of the yard arm elements shown in perspective.

Figure 8 illustrates an additional type of carrier element or container which can be conveniently employed with the cart of this invention.

As shown in the drawings:

The reference numeral 10 indicates generally the main body portion or supporting element of the improved mail bag cart of this invention, the same being preferably a straight tubular element with bifurcated ground contacting supporting legs 12 fastened to its lower end.

An operating handle 14 is pivotally mounted adjacent the top of the tubular main portion 10 and this is connected by means of a link 16 to the structure 18 which supports the wheels 20 in collapsible and foldable relationship. This wheel collapsing and folding construction is substantially the same as that disclosed in two prior patented devices of Joseph F. Chamberlin, both granted on January 27, 1953, one entitled "Foldable Golf Cart," Patent No. 2,626,814, and the other entitled "Collapsible Golf Cart," Patent No. 2,626,815, and the construction or something similar thereto is also shown, described and claimed in two of our joint applications for patent, one entitled "Cart For Golf Bags," filed May 12, 1953, Serial No. 354,488 now Patent Number 2,741,490, and the other entitled "Collapsible Cart For Golf Bags," filed May 20, 1954, Serial No. 431,190, now Patent Number 2,740,638.

The upper end of the main tubular body portion 10 is bent slightly forwardly as best shown at 22 in Figures 5 and 6 to provide a convenient post or the like upon which one of the rings 24 of a mail bag 26 or similar element can be slipped or hooked.

At approximately the bend in the tubular body portion 10, there is pivotally connected a latching link 28 having a slot or notch 29 in its outer free end which is adapted to be fitted over a projecting headed pin 30 in a pivoted rod or tube 32 which is mounted at 34 on a bracket 36 fitted to the main frame member 10 just above the connection for the pivoted arms 18.

The end of the yard arm 32 extends slightly beyond the point of positioning of the headed pin 30 and this provides a second support for the other ring 24 of a mail bag 26. These supports are sufficient in extent to receive a pair of rings each so that two mail bags may be readily and conveniently supported on the cart while at the same time a single bag may be carried without in any way disturbing the proper balance of the cart either when static or in motion. From an inspection of Figure 2, it will be noted that the center of gravity of the load is practically always directly over the imaginary line comprising the axle for the wheels 20. This center of gravity positioning is indicated by the dot and dash line 40.

In Figure 8, there is illustrated a substitute for the mail bags 20 comprising a basket 42 having rings 44 which will readily fit over the posts 22 and 32, and baskets, boxes and crates such as this can be used instead of or alternatively with the mail bags 26. Other containers may obviously be readily employed with little or no change in the cart structure, and square tubing or steel straps may be substituted for the members shown.

The bolts which pivotally support the frame 32 and the link 28 can be readily removed, thereby permitting a single bag bracket such as that illustrated in our application for patent, Serial Number 455,589, now abandoned, to be inter-changeably employed.

It will be evident that herein is provided a mail bag cart which can conveniently, simply and efficiently transport one or two mail bags while at the same time allowing of a ready access to the contents thereof for mail distribution. The weight is always centrally balanced over the wheels when the cart is in mobile position, and the prongs or bifurcations provide a multiple support for the cart and its contents when the same is at rest. The arms 28 and 32 can be readily folded so as to permit of a convenient storage of a cart or a number of same into relatively small space, and with slight adaptations, the device can be used for many other purposes. The weight in the bags or other containers on the cart is always equally divided so far as the actual support of same is concerned, and there will never be any undesirable change in plane, so far as the actual operating center of gravity is concerned. The bags themselves are supported at a convenient height for distribution of the contents without necessitating too much bending on the part of the postman, but are not high enough to interfere with the mechanism, or proper operation.

The load will never become overbalanced in that the wheels are spaced sufficiently apart to allow carrying of the weight on one side or wheel without upsetting the operating equilibrium. The bifurcated support 12 stabilizes the cart when folded and while standing in folded position. It also stabilizes the cart when it is loaded and in operative position but not moving. There will be no tendency for tipping or upset in that a four-point support is provided which will take care of ordinary forces directed against the cart at any angle, and even when the same is positioned on uneven or sloping ground. The bend at the top of the body is for the purpose of assisting to position the weight of the load in the bag or other container properly over the axle, and also to provide an upright hooking point for bags, baskets and the like. The body member 10, the handle 14, the arm 32 and other elements need not necessarily be tubular but could be bars, strips, square in cross section or the like, and may even be composed of materials other than metal, such as plastics, reinforced glass fibrous materials or other suitable materials.

We are aware that many changes may be made and numerous details of construction varied throughout a wide range without departing from the principles of this invention, and we therefore do not propose limiting the patent granted hereon otherwise than as necessitated by the prior art.

We claim as our invention:

A mail bag cart comprising a tubular frame element, a foldable handle thereon, a pair of wheels for the frame, means connected to the handle for bringing the wheels together when the handle is folded, a collapsible rack on the frame for supporting a mail bag, the rack comprising a yard arm pivotally and removably connected to the frame and a link for the yard arm also pivotally and removably connected to the frame, the connection for the yard arm being adjacent the middle of the frame and the connection for the link being adjacent the top of the frame, a headed pin fitted into the free end of the yard arm, a slot in the free end of the link for releasable connection with the headed pin, the end of the main frame element and the end of the yard arm both projecting above the associated and respectively juxtaposed ends of the link and providing supports for the mail bag rings, the yard arm and link extending forwardly of the frame for selectively supporting one or two mail bags when desired, a forwardly extending bifurcated ground contacting support fastened to the lower end of the frame, the center of gravity of the load being over a point between the ground contacting portions of the wheels and the bifurcated support when the cart is at rest and the center of gravity of the weight being over a line connecting the ground contacting points of the wheels and the axle when the cart is in mobile position.

References Cited in the file of this patent

UNITED STATES PATENTS

| | | |
|---|---|---|
| 1,883,585 | Constable | Oct. 18, 1932 |
| 2,395,275 | Jackson | Feb. 19, 1946 |
| 2,407,385 | Rubin et al. | Sept. 10, 1946 |
| 2,582,435 | Howard | Jan. 15, 1952 |
| 2,626,814 | Chamberlin | Jan. 27, 1953 |
| 2,772,890 | Gastright | Dec. 4, 1956 |

FOREIGN PATENTS

| | | |
|---|---|---|
| 623,169 | France | June 17, 1927 |
| 906,027 | France | Dec. 20, 1945 |
| 74,830 | Norway | Mar. 21, 1949 |